Jan. 23, 1934.  L. A. COLLINS  1,944,495
ELECTRIC LIQUID HEATER
Filed Nov. 22, 1932
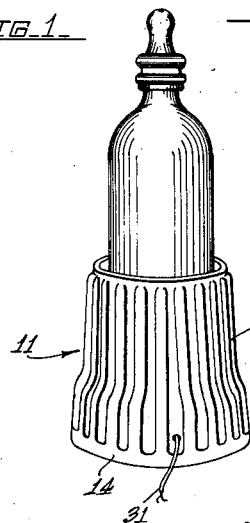
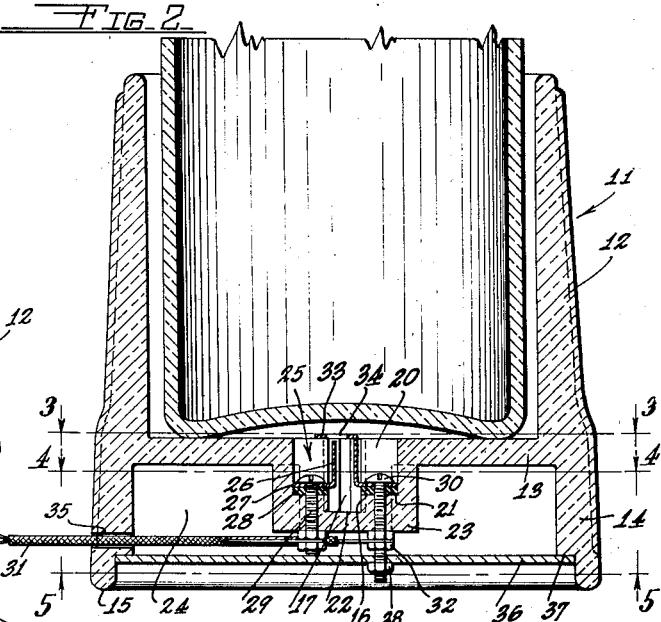
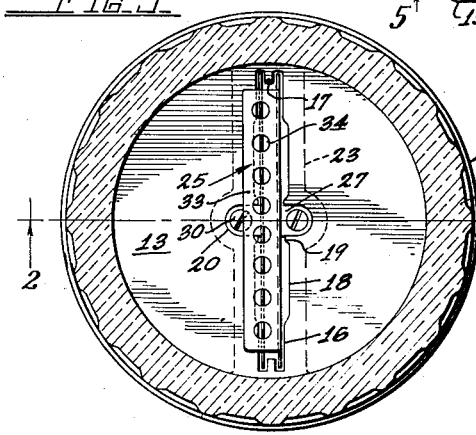
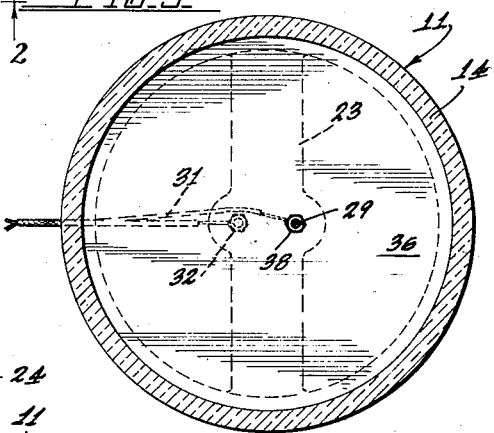
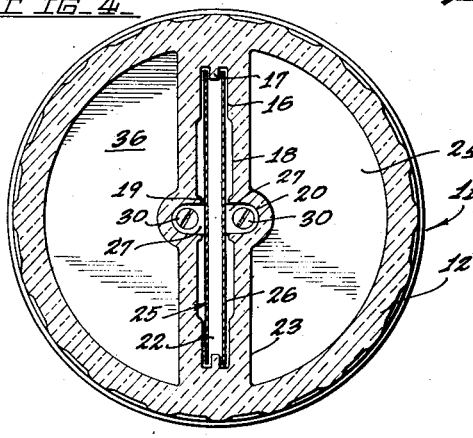
INVENTOR
L. A. COLLINS
BY Hazard & Miller
ATTORNEYS Patented Jan. 23, 1934

1,944,495

UNITED STATES PATENT OFFICE 1,944,495

ELECTRIC LIQUID HEATER

Lawrence A. Collins, Long Beach, Calif.

Application November 22, 1932
Serial No. 643,865

3 Claims. (Cl. 219—40)

My invention relates to a liquid heater of the type for evaporating a small amount of water at a time and thus particularly adapted for heating small articles such as infants' feeding bottles.

I preferably employ my invention with a cup-like vessel in which the water may be poured, the heater being located at the bottom of the vessel and heats the water to generate steam, the steam transferring the heat to the remain water and hence to the feed bottle or other article placed in the cup-like receptacle.

In this type of invention one of the objects and features thereof is heating the water or other liquid by the electrolytic action of the current flowing between a pair of electrodes immersed in the water. In conjunction with this electrolytic type of heating another feature of my invention is in providing a structure in the form of a well below the electrodes, such well being designed to receive any sediment such as lime deposited from the water.

Another feature of my invention relates to the construction of the electrodes in the form of a pair of vertical parallel plates providing a rib in the wall of the receptacle to maintain these plates always spaced apart.

Another feature is locating the electrodes in a recess below the inside of the bottom of the receptacle, this recess and the well usually being of sufficient capacity for heating an amount of water necessary to warm a feed bottle to its proper temperature and therefore usually the water does not need to fill the receptacle above the bottom of the bottle.

Another feature of my invention is forming one of the electrodes with a horizontal upper flange which extends across the recess in the base of the receptacle. This flange prevents a person from inserting a cleaning instrument or a finger between the electrodes, and thus eliminates the danger of a short circuit. This horizontal flange is provided with perforations which allow circulation of the water and the steam developed in electrolytic heating.

Another feature of my invention relates to making the electrodes in narrow elongated plates and the recess in which they fit also elongated and extending substantially from one side of the receptacle to the other, for a circular receptacle this being across one of the diameters.

Another feature of my invention relates to a water tight connection for the electric leads through the base of the receptacle, this being by using bolts extending through perforations at the bottom of the recess and providing soft metal packing washers for the heads of the bolts in the recess, such washers forming a water tight seal against the bolts and the openings or perforations through the bottom of the receptacle.

My invention is illustrated in connection with the accompanying drawing, in which Fig. 1 is a perspective view of a liquid heater with an infant's feeding bottle inserted therein.

Fig. 2 is a vertical section on the line 2—2 of Fig. 3 in the direction of the arrows.

Fig. 3 is a horizontal section on the line 3—3 of Fig. 2 in the direction of the arrows.

Fig. 4 is a horizontal section on the line 4—4 of Fig. 2 in the direction of the arrows.

Fig. 5 is a horizontal section on the line 5—5 of Fig. 2 in the direction of the arrows.

In my invention I employ a liquid receptacle 11 which has a side wall 12 which is cylindrical on the inside and may be more or less ornamental on the outside. The receptacle has a base 13 which, with the side wall 12, forms a cup-like structure. Extending down from the base there is a depending skirt 14 having a lower edge 15 adapted to rest on a table or the like. The base is provided with a depending recess 16 which extends substantially diametrically across the bottom or base. At each end of the vertical recess there is a vertical rib 17. The recess has lateral enlargements 18 and adjacent the center there are inwardly projecting vertical ribs 19. Between these ribs are semi-circular enlargements 20, these enlargements terminating at the bottom 21 of the recess. Extending downwardly from the bottom 21 there is a relatively deep well 22 which also extends the full length of the recess, that is, to the ribs 17. A depending structure 23 extending below the base 13 accommodates the recess and the well together with the connecting bolts, to be hereinunder described, these being all within the hollow space 24 between the bottom of the base and the bottom edges 15 of the skirts 14.

Each electrode 25 has a vertical plate 26 and a laterally extending tongue 27, the tongue fitting in the semi-circular enlargement 20 of the recess and is seated on a soft metallic packing washer 28. A bolt 29 extends through the tongue, the washer, and through a perforation in the bottom of the structure 23, the head 30 of the bolt being in the enlargement 20 of the recess. Electric leads 31 are attached to the bolts at the outside by nuts and lock nuts 32. These form the electric connections to the bolts which are connectors through the insulating portion of the bottom structure of the receptacle.

The plates 26 besides being held apart by their rigid attachment to the tongues 27 are maintained spaced apart by the ribs 17 at opposite ends as indicated in Figs. 3 and 4. One of the plates has a horizontal flange 33, such plate being higher than the other plate and there being a flange extending across the upper edge of the opposite plate, there being a clearance between this upper edge and the flange. Such flange is of less length than the distance between the two ribs 17 and overlaps the edge of the enlarged section 18 of the recess, the under side of the flange resting on the surface of the inside of the base 13 of the receptacle. This flange is provided with a series of perforations 34. The horizontal flange 33 attached to the upper edge of one of the electrode plates extends over the space between these plates and prevents accidental insertion of a cleaning instrument or a person's fingers and thus eliminates the danger of a short circuit should a person accidentally attempt to clean the space between the electrodes or attempt to touch the electrodes with the finger while these are energized.

The electric leads extend through an opening 35 in the depending skirt 14 and to prevent accidental shock or short circuiting of the terminal bolts an underneath cover 36 rests on an annular shoulder 37 and is held in place by a nut 38 on one of the bolts 29, such bolt being longer than the other bolt.

The manner of using my invention is as follows: The nuts 32 securing the lead wires to the bolts are pulled up sufficiently tight to cause the soft metallic washers 28 to form a liquid tight seal with the bolts and with the opening or perforations in the bottom structure 23 through which these extend. A small amount of water is placed in the receptacle, this running into the recess at the bottom and for ordinary infant feeding bottle heating it is not necessary to use a quantity of water which would rise above the bottom of the receptacle. The electrodes, however, must be immersed in the water to form an electrolytic path between the pair of electrodes and one of the plates and the flange 33, although it is not necessary that this flange be immersed in the water. The passage of the electric current through the small amount of water confined in the recess quickly heats this to a boiling point, generating steam, which steam escapes upwardly against the bottom of the feed bottle and around the sides of the bottle, thereby heating the contents of the bottle. Any sediment that forms such as a lime deposit from the water may collect in the well 22 from which it may be scraped by inserting a sharp instrument through the perforations 34 and may then be washed out in washing the receptacle.

Various changes may be made in the principles of my invention without departing from the spirit thereof, as set forth in the description, drawing and claims.

I claim:

1. A liquid heater comprising in combination a receptacle formed of insulating material and being in the form of a cup having a cylindrical inside surface with a base having a central diametrically depending portion with a recess formed in this latter portion, the recess extending diametrically across the base, a skirt extending below the base and having a lower edge on which the receptacle may rest, leaving a hollow space inside the skirt and below the base, electrodes secured in the recess by conducting bolts extending through the depending structure, the electrodes being spaced apart, electric leads through the skirt connected to said bolts, a closure cover fitted against a shoulder in the skirt and held in place by one of the bolts, said cover preventing accidental contact with the electric leads or the said bolts.

2. A liquid heater as claimed in claim 1, a well below the receptacle and extending the full length thereof, said well having vertical ribs spacing opposite ends of the electrodes apart, one of the electrodes having a horizontal flange with perforations extending over the top of the other electrode and spaced therefrom and over a portion of the recess.

3. A liquid heater comprising a receptacle in the form of a cup with a side wall cylindrical on the inside and a base, the base having a recess extending diametrically thereacross, and a pair of parallel spaced vertical electrode plates secured at the bottom of the recess, said plates extending substantially the full length of the recess, the walls of the cup-like receptacle having a depending skirt with a lower edge on which the receptacle may rest, leaving a hollow space inside of the skirt and below the base, electric leads extending through the skirt and being attached to connecting bolts from the electrodes through the base at the bottom of the recess, and a closure cover fitted to the lower portion of the skirt and enclosing the electric leads and the connecting bolts.

LAWRENCE A. COLLINS.